(12) United States Patent
Xiao et al.

(10) Patent No.: US 11,519,890 B2
(45) Date of Patent: Dec. 6, 2022

(54) DETECTION METHOD FOR N-NITROSODIMETHYLAMINE IMPURITIES

(71) Applicant: Zhejiang Huahai Pharmaceutical Co., Ltd, Zhejiang (CN)

(72) Inventors: Tan Xiao, Zhejiang (CN); Tianpei Huang, Zhejiang (CN); Jinsheng Lin, Zhejiang (CN); Qiang Zhou, Zhejiang (CN); Tong Wu, Zhejiang (CN); Danfeng Ye, Zhejiang (CN); Hong Cai, Zhejiang (CN); Wenquan Zhu, Zhejiang (CN); Wenbin Chen, Zhejiang (CN); Min Li, Zhejiang (CN)

(73) Assignee: ZHEJIANG HUAHAI PHARMACEUTICAL CO., LTD, Zhejiang (CN)

( * ) Notice: Subject to any disclaimer, the term of this patent is extended or adjusted under 35 U.S.C. 154(b) by 213 days.

(21) Appl. No.: 17/258,226

(22) PCT Filed: Jul. 10, 2018

(86) PCT No.: PCT/CN2018/095142
§ 371 (c)(1),
(2) Date: Jan. 6, 2021

(87) PCT Pub. No.: WO2020/010516
PCT Pub. Date: Jan. 16, 2020

(65) Prior Publication Data
US 2021/0285920 A1    Sep. 16, 2021

(30) Foreign Application Priority Data

Jul. 7, 2018 (CN) .......................... 201810740353.3

(51) Int. Cl.
*G01N 30/72* (2006.01)
*G01N 30/88* (2006.01)
*G01N 30/06* (2006.01)

(52) U.S. Cl.
CPC ......... *G01N 30/7206* (2013.01); *G01N 30/88* (2013.01); *G01N 2030/067* (2013.01);
(Continued)

(58) Field of Classification Search
CPC ............... G01N 30/7206; G01N 30/88; G01N 2030/067; G01N 2030/884; G01N 2030/8872; G01N 30/72; G01N 2030/8809
See application file for complete search history.

(56) References Cited

U.S. PATENT DOCUMENTS 8,481,155 B2    7/2013 Iwase et al.

FOREIGN PATENT DOCUMENTS

| CN | 104568562 A | 4/2015 |
| CN | 106770740 A | 5/2017 |

(Continued)

OTHER PUBLICATIONS

Fei Chen, "Determination of N-Nitroso Two Methylamine in Water by Prge and Trap Gas Chromatography Mass Spectrometry," Chemical Engineer, Jun. 2018, pp. 28-30 and 14, vol. 273, No. 6, including English language Abstract.

International Search Report/Written Opinion dated Mar. 12, 2019 in related/corresponding PCT Application No. PCT/CN2018/095142.

Ye Cao et al., "Analysis of impurities and oxidization products in hydrazine fuels by GC-MS," Chinese Journal of Analysis Laboratory, Dec. 2006, pp. 62-64, vol. 25, No. 12, including English language Abstract.

(Continued)

*Primary Examiner* — Jennifer Wecker
*Assistant Examiner* — Michael Paul Shimek
(74) *Attorney, Agent, or Firm* — Patent Portfolio Builders PLLC

(57) ABSTRACT

Disclosed is a detection method for N-nitrosodimethylamine (NDMA) impurities, comprising: (1) obtaining a test solution containing a sample to be tested; and (2) detecting the (Continued)

test solution by means of gas chromatography-mass spectrometry to determine the content of an N-nitrosodimethylamine impurity in the sample. The method provided in the present invention has a good separating effect, a wide linear range, a high sensitivity and a good method durability, and can detect the content of N-nitrosodimethylamine (NDMA) in the sample rapidly and effectively.

19 Claims, 1 Drawing Sheet

(52) U.S. Cl.
CPC .............. *G01N 2030/884* (2013.01); *G01N 2030/8872* (2013.01)

(56) References Cited

FOREIGN PATENT DOCUMENTS

| | | |
|---|---|---|
| KR | 20150106682 A | 9/2015 |
| RU | 2521711 C1 | 7/2014 |

OTHER PUBLICATIONS

Chen Wenwen et al., "Comparison of gas chromatography-mass spectrometry and gas chromatography-tandem mass spectrometry with electron ionization for determination of N-nitrosamines in environmental water," Elsevier, Ltd., Dec. 5, 2016, pp. 1400-1410, vol. 168.

Extended European Search Report in corresponding / related European Application No. 18 92 6246.2 dated Jun. 16, 2021.

M. Aragon et al., "Determination of N-nitrosamines and nicotine in air particulate matter samples by pressurised iquid extraction and gas chromatography-ion trap tandem mass spectrometry," TALANTA, Jul. 12, 2013, pp. 896-901, vol. 115.

V. G. Amelin et al., "Combination of Microwave Heating Extraction and Dispersive Liquid-Liquid Microextraction for the Determination of Nitrosoamines in Foods Using Gas—Liquid Chromatography with a Mass-Spectrometric Detector," Journal of Analytical Chemistry, Apr. 7, 2016, pp. 359-364, vol. 71, No. 4.

Jing Wenjie "Headspace Method Analysis of VOC in Car Seat Foam," Chemical Propellants & Polymeric Materials, vol. 14, pp. 75-78, 2016.

Office Action received in corresponding CN application No. 201880094511.0 dated Sep. 2021.

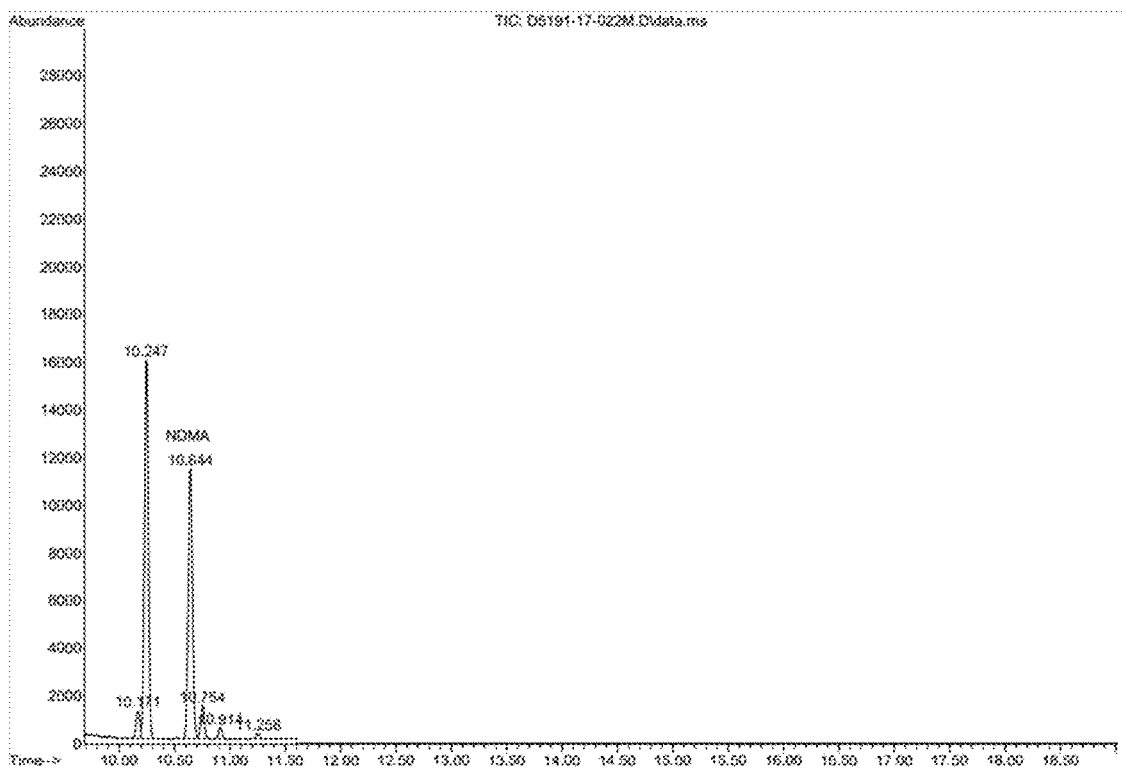

DETECTION METHOD FOR N-NITROSODIMETHYLAMINE IMPURITIES

This application is a U.S. National Stage of PCT/CN2018/095142 filed Jul. 10, 2018, which claims the priority of the Chinese Patent Application No. 201810740353.3, with the title of "An analytical method for detecting trace N-nitrosodimethylamine (NDMA) impurity in a sample by gas chromatography-mass spectrometry", filed on Jul. 7, 2018 before the China National Intellectual Property Administration, which are hereby incorporated by reference in their entirety.

FIELD OF THE INVENTION

The present application relates to the field of chemical analysis, in particular to a method for detecting N-nitrosodimethylamine impurity.

BACKGROUND OF THE INVENTION

Representative products of angiotensin II receptor antagonists (ARBs) are Losartan Potassium, Valsartan, Irbesartan, and Candersartan Celexetil Ester, which are commonly used antihypertensive drugs in clinic. All of the antihypertensive drugs contain biphenyltetrazolium group. The most common construction strategy of this functional group is to use cyanobiphenyl and azide to synthesize tetrazolium ring at high temperature. The general industrializable route of these sartan compounds is as follows:

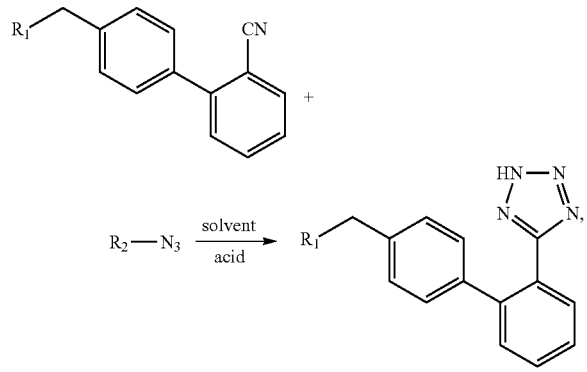

wherein $R_1$ represents

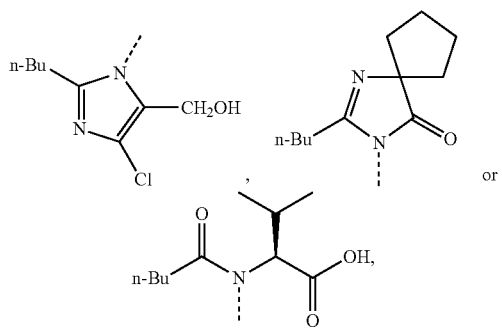

etc., and $R_2$ represents Na, K, or TMS, etc. The solvent can be selected from the group consisting of N,N-dimethylformamide, toluene, xylene and the like.

In the synthetic route of the aforementioned sartan API (Active Pharmaceutical Ingredient) products, N,N-dimethylformamide (DMF) is the most commonly used solvent in the cyclization process of tetrazole, since DMF has excellent solubility and relatively high boiling point. Moreover, sodium azide, $TMSN_3$ and other reactants used in the reaction are excessive in order to ensure the full transformation of a cyanobiphenyl intermediate in the reaction process. The remaining azide compounds need to be quenched after the reaction, otherwise the residual azide compounds will produce highly toxic azide acid in the following procedures. In addition, materials containing residual azide compounds are prone to explosion when they contact with materials containing copper or other transition metal materials during transportation and transferring. In the prior art, the residual azide compounds are usually treated with nitrous acid under acidic conditions.

SUMMARY OF THE INVENTION

The inventors of the present application have found that when DMF is used as solvent in the above synthesis route, DMF is prone to decomposition to produce dimethylamine during the reaction process, which may react with nitrite to produce highly toxic N-nitrosodimethylamine (NDMA) impurity, and the structural formula thereof is as follows:

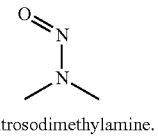

N-Nitrosodimethylamine.

Through further in-depth study, it has been found that when the technological process is unreasonable or the process parameters are not properly controlled, trace N-nitrosodimethylamine (NDMA) will be produced in a sartan API product. Therefore, in order to realize the quality control of a sartan API intermediate, a solvent used in the process, a sartan API or a composition containing a sartan API, the N-nitrosodimethylamine (NDMA) in a related product needs to be detected.

The object of the present application is to provide a method for detecting N-nitrosodimethylamine (NDMA) impurity in a sample. This method is especially suitable for detecting trace N-nitrosodimethylamine (NDMA) impurity. The specific solution is as follows:

a method for detecting N-nitrosodimethylamine impurity, wherein the method comprises the following steps:

(1) obtaining a test solution containing the sample to be detected; and (2) detecting the test solution by gas chromatography-mass spectrometry (GC-MS) to determine the content of N-nitrosodimethylamine impurity in the sample.

In some embodiments of the present application, the test solution can be prepared directly in a sample bottle or headspace bottle suitable for gas chromatography-mass spectrometry injection. The test solution can also be prepared in other containers, and then the test solution is transferred to the sample bottle or headspace bottle for injection and detection. In specific embodiments, whether to use the sample bottle or the headspace bottle can be determined according to the actual sample injection mode.

In some specific embodiments of the present application, the method includes the following steps:

(1) dissolving the sample to be detected which is suspected to contain N-nitrosodimethylamine impurity in a diluent to prepare the test solution; when the sample to be detected is a solvent used in a synthesis process of a sartan API, the solvent is injected directly without the diluent; and (2) transferring the prepared test solution to an injection vial or headspace bottle, and analyzing the solution in the injection vial or headspace bottle by gas chromatography-mass spectrometry.

The sample to be detected used herein can also be called as the sample, the diluent used herein can also be called as a diluent solution, and the test solution used herein can also be called as a sample solution.

In some embodiments of the present application, step (2) comprises: injecting the test solution into the gas chromatography-mass spectrometry for detection, recording a spectrum of the test solution, and determining the content of N-nitrosodimethylamine in the sample to be detected according to a standard curve of N-nitrosodimethylamine obtained in advance.

In the specific embodiments, the peak area of N-nitrosodimethylamine in the test solution can be determined by recording the spectrum of the test solution, and then according to the determined standard curve and using the standard curve method, the content of N-nitrosodimethylamine in the test solution can be determined, and then after simple calculation, the content of N-nitrosodimethylamine impurity in the sample can be determined.

It should be noted that the standard curve method is a well-known quantitative method in the art, and it is not defined herein.

In some specific embodiments of the present application, the standard curve of N-nitrosodimethylamine is determined by the following methods:

preparing a series of standard solutions of N-nitrosodimethylamine with different known concentrations;

injecting the standard solutions of N-nitrosodimethylamine into the gas chromatography-mass spectrometry for detection, recording the spectra, and determining the standard curve of N-nitrosodimethylamine according to the peak area of N-nitrosodimethylamine and the corresponding concentrations of N-nitrosodimethylamine; for example, determining the standard curve of N-nitrosodimethylamine by using the concentration of N-nitrosodimethylamine as abscissa or ordinate and the peak area of N-nitrosodimethylamine as ordinate or abscissa.

In some embodiments of the present application, the sample to be detected can be a sample which is suspected to contain N-nitrosodimethylamine (NDMA) impurity, including but not limited to, the sartan API intermediate, the solvent used in the process, the sartan API or the composition containing the sartan API.

In some embodiments of the present application, the sartan API are selected from the group consisting of the compounds shown in Formula I:

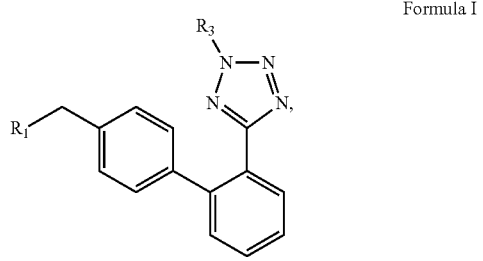

Formula I wherein $R_1$ represents

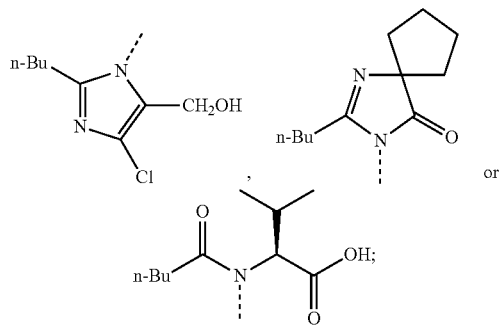

$R_3$ represents H or K; herein, n-Bu represents n-butyl.

More specifically, the sartan API is selected from the group consisting of Losartan potassium, Irbesartan, Valsartan and the like.

Herein, a sartan API intermediate refers to a compound used for the synthesis of the aforementioned sartan API, including but not limited to, a compound shown in Formula II:

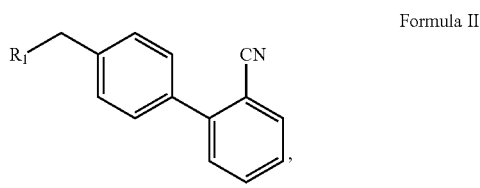

Formula II wherein $R_1$ represents

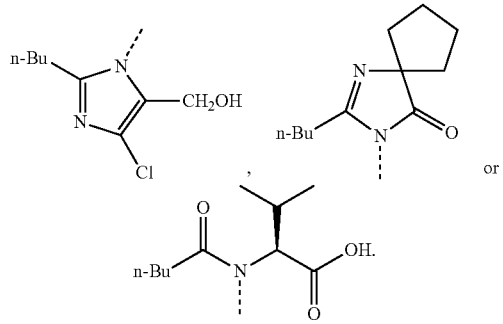

The solvent used in the process refer to the solvent used in the synthesis of the sartan API, including but not limited to ethyl acetate, toluene, xylene, methanol, N,N-dimethylformamide (DMF), methyl tert-butyl ether, dichloromethane and the like.

In some embodiments of the present application, when the sample to be detected is solid, step (1) includes: dissolving the sample to be detected in the diluent to obtain the test solution; when the sample to be detected is liquid, such as the solvent used in the process, the solvent can be directly used as the test solution.

More specifically, when the sample to be detected is the sartan API intermediate or sartan API, the sample to be detected is dissolved in the diluent to obtain the test solution;

when the sample to be detected is the composition containing the sartan API, the composition containing the sartan API is disintegrated with the diluent to obtain the test solution; or when the sample to be detected is the solvent used in the process, the solvent is directly used as the test solution.

In some embodiments of the present application, the method for detecting N-nitrosodimethylamine impurity according to the present application may include the following steps:

(1) when the sample to be detected is the sartan API intermediate or sartan API, dissolving the sartan API intermediate or sartan API in the diluent, and preparing the test solution containing 1-5000 mg, preferably 1-1000 mg, more preferably 5-500 mg, and most preferably 5-200 mg of the sartan API intermediate or sartan API in 1 mL of the test solution;

when the sample to be detected is the sartan API composition, disintegrating the sartan API composition in the diluent, and preparing the test solution containing 1-5000 mg, preferably 1-1000 mg, more preferably 5-500 mg, and most preferably 5-30 mg of the sartan API in 1 mL of the test solution;

when the sample to be detected is the solvent used in the process, the solvent is directly used as the test solution;

(2) injecting the test solution into the gas chromatography-mass spectrometry for detection, recording the spectrum of the test solution, and determining the content of N-nitrosodimethylamine in the sample according to the standard curve of N-nitrosodimethylamine obtained in advance.

In some specific embodiments of the present application, the diluent is selected from the group consisting of water, and a polar organic solvent or a mixture thereof. The polar organic solvent is one further selected from the group consisting of N,N-dimethylformamide (DMF), N-methylpyrrolidone, dimethyl sulfoxide (DMSO), methanol, ethanol, isopropanol, acetone, methyl tert-butyl ether, acetonitrile, ethylene glycol, propanediol, glycerol, formic acid, acetic acid, propionic acid, methanesulfonic acid, triethylamine, dimethylamine, dimethylpropylamine, pyridine, morpholine, piperazine, tetrahydropyrrole, and piperidine or any combination thereof.

In the method for detecting N-nitrosodimethylamine impurity by gas chromatography-mass spectrometry, the chromatographic conditions of the gas chromatography-mass spectrometry are as follows:

analysis column: gas chromatographic column, wherein the stationary phase is composed of one selected from the group consisting of polysiloxane polymer, cyanopropylphenyl dimethylpolysiloxane copolymer, cyanopropylphenyl dimethylpolysiloxane copolymer, trifluoropropyl dimethylpolysiloxane copolymer, phenyl dimethylpolysiloxane copolymer, dipropylphenyl dimethylpolysiloxane copolymer, diphenyldimethylpolysiloxane copolymer, and polyethylene glycol or any combination thereof;

the stationary phase of the gas chromatographic column is preferably composed of 14% cyanopropylphenyl-86% dimethylpolysiloxane copolymer, 35% phenyl-65% dimethylpolysiloxane copolymer, 5% phenyl-95% dimethylpolysiloxane copolymer, 6% cyanopropyl-94% dimethylpolysiloxane copolymer, 7% cyanopropyl-7% phenyl-86% dimethylpolysiloxane copolymer, 50% cyanopropyl-50% dimethylpolysiloxane copolymer, 5% cyanopropyl-95% dimethylpolysiloxane copolymer or polyethylene glycol (having a molecular weight of: 10,000-1,000,000).

A carrier gas is selected from the group consisting of hydrogen, nitrogen and helium;

a column temperature: 30° C.-350° C.; preferably 40° C.-300° C.; more preferably 45° C.-250° C.;

a split ratio: 1:1-500:1; preferably 1:1-100:1; more preferably 1:1-50:1; further preferably 3:1-25:1;

an inlet temperature: 100° C.-350° C.; preferably 150° C.-300° C.; more preferably 150° C.-200° C.;

an injection mode: direct injection or headspace injection; preferably headspace injection; and an detector is selected from the group consisting of a mass spectrometry detector (MSD); preferably a single quadrupole mass spectrometer, a quadrupole-time-of-flight mass spectrometer (QTOF), or a triple quadrupole mass spectrometer (TQS).

The method for detecting N-nitrosodimethylamine impurity by gas chromatography-mass spectrometry according to the present application has the advantages of good separation effect, simple operation, high sensitivity and having wide linear range, and is capable of quickly and effectively detecting the content of N-nitrosodimethylamine (NDMA) in the sample.

DESCRIPTION OF THE DRAWINGS

In order to more clearly illustrate the embodiment of the present application and the technical solution of the prior art, the following is a brief introduction to the drawings needed in the embodiments and the prior art. It is apparent for those skilled in the art that the drawings described below are only some examples of the present application, and other drawings can be obtained according to these drawings without creative work.

FIG. 1 is a GC-MS pattern of detection of N-nitrosodimethylamine (NDMA) in Valsartan API in Example 1.

DETAILED DESCRIPTION OF THE INVENTION

In order to make the purpose, technical solution, and advantages of the present application more clearly, the present application is further described in detail with reference to the attached drawings and examples. It is apparent that the embodiments described herein are only some examples of the present application but not all examples. Based on the examples of the present application, all other examples obtained by those skilled in the art without creative work will fall within the scope of the protection of the present application.

Using N-nitrosodimethylamine (NDMA) as the reference substance, the content of NDMA in the sartan API intermediate, the solvent used in the process, the sartan API or the composition containing the sartan API was detected as follows:

EXAMPLE 1

Chromatographic Conditions:
an instrument: Agilent gas chromatography single quadrupole mass spectrometer (Agilent 7697A/5975C/7890A);
a chromatographic column: DB-624, 30 m×0.32 mm, 1.8 μm (stationary phase composition: 6% cyanopropyl-94% dimethylpolysiloxane copolymer);
a carrier gas: helium;
a linear velocity: 1.0 mL/min;
an inlet temperature: 160° C.;

an injection volume: 1.0 μL;
a split ratio: 10:1;
a heating procedure:
an initial temperature is 60° C., holding for 2 min, then heating up to 240° C. at a rate of 15° C./min, holding for 5 min;
an ion source mode: EI, positive ion;
an ion source: 230° C.;
a temperature of the quadrupole: 150° C.;
a relative voltage: 200V;
a scanning mode: single ion extraction mode (SIM);
SIM ion current: m/z 74.0;
a diluent: DMSO; and
Blank solution: the same as the diluent Preparation of standard solutions for N-nitrosodimethylamine (NDMA) reference substance: an appropriate amount of N-nitrosodimethylamine (NDMA) reference substance was diluted in the diluent to NDMA concentration of: 0.2, 0.8, 3.2, 6.4, 20 μg/mL, respectively, shaking until completely dissolved before use.

Detection of the Content of N-Nitrosodimethylamine (NDMA) in Valsartan API:

400 mg Valsartan API (sample 1) was taken and precisely weighed into a 20 mL headspace bottle. After that, 2 mL of the diluent was accurately added, shaken until dissolved and mixed well, as a test solution. The above-mentioned GC-MS method was used to detect the test solution and NDMA standard solutions of different concentrations, and the standard curve method was used to calculate the content of NDMA in sample 1. The content of N-nitrosodimethylamine (NDMA) in Valsartan API (sample 1) was 13.0 ppm.

The GC-MS pattern of N-nitrosodimethylamine (NDMA) in Valsartan API (sample 1) is shown in FIG. 1.

EXAMPLE 2

Chromatographic Conditions:
the instrument: ThermoFischer gas chromatography single quadrupole mass spectrometry (Trace 1300 & ISQLT)
the chromatographic column: DB-1701, 60 m×0.32 mm, 1.8 μm (14% cyanopropylphenyl-86% dimethylpolysiloxane copolymer)
the carrier gas: helium
the linear velocity: 1.0 mL/min
the inlet temperature: 180° C.
the injection volume: 2.0 μL
the split ratio: 25:1
the heating procedure:
the initial temperature is 60° C., holding for 2 min, then increased to 240° C. at a rate of 15° C./min, holding for 5 min
the ion source mode: EI, positive ion
the ion source: 250° C.
the temperature of the quadrupole: 160° C.
the relative voltage: 200 V
the scanning mode: single ion extraction mode (SIM)
SIM ion current: m/z 74.0
the diluent: DMSO and
the blank solution: the same as the diluent
Preparation of standard solutions for N-nitrosodimethylamine (NDMA) reference substance: an appropriate amount of N-nitrosodimethylamine (NDMA) reference substance was diluted in the diluent to NDMA concentration of: 0.2, 0.8, 3.2, 6.4, 20 μg/mL, respectively, shaked until completely dissolved before use.

Detection of the Content of N-Nitrosodimethylamine (NDMA) in Valsartan API:

400 mg Valsartan API (sample 2) was taken and precisely weighed into a 20 mL headspace bottle. After that, 2 mL of the diluent was accurately added, shaken until dissolved and mixed well, as a test solution. The above-mentioned GC-MS method was used to detect the test solution and NDMA standard solutions of different concentrations, and the standard curve method was used to calculate the content of NDMA in sample 2. The content of N-nitrosodimethylamine (NDMA) in Valsartan API (sample 2) was 3.4 ppm.

EXAMPLE 3

Chromatographic Conditions:
the instrument: Agilent gas chromatography single quadrupole mass spectrometer (Agilent 7697A/5975C/7890A)
the chromatographic column: HP-5, 30 m×0.32 mm, 1.5 μm (stationary phase composition: 5% phenyl-95% dimethylpolysiloxane copolymer)
the carrier gas: helium
the linear velocity: 1.0 mL/min
the inlet temperature: 180° C.
the injection volume: 1.0 μL
the split ratio: 10:1
the heating procedure:
the initial temperature is 55° C., holding for 3 min, then increased to 250° C. at a rate of 15° C./min, holding for 5 min
the ion source mode: EI, positive ion
the ion source: 240° C.
the temperature of the quadrupole: 150° C.
the relative voltage: 220 V
the scanning mode: single ion extraction mode (SIM)
SIM ion current: m/z 74.0
the diluent: DMSO and
the blank solution: the same as the diluent
Preparation of standard solutions for N-nitrosodimethylamine (NDMA) reference substance: an appropriate amount of N-nitrosodimethylamine (NDMA) reference substance was diluted in the diluent to NDMA concentration of: 0.2, 0.8, 3.2, 6.4, 20 μg/mL, respectively, shaken until completely dissolved before use.

Detection of the Content of N-Nitrosodimethylamine (NDMA) in Irbesartan API:

400 mg Irbesartan API (sample 3) was taken and precisely weighed into a 20 mL headspace bottle. After that, 2 mL of the diluent was accurately added, shaken until dissolved and mixed well, as a test solution. The above-mentioned GC-MS method was used to detect the test solution and NDMA standard solutions of different concentrations, and the standard curve method was used to calculate the content of NDMA in sample 3. The content of N-nitrosodimethylamine (NDMA) in Irbesartan API (sample 3) was 0.28 ppm.

EXAMPLE 4

Chromatographic Conditions:
the instrument: ThermoFischer gas chromatography single quadrupole mass spectrometry (Trace 1300 & ISQLT)
the chromatographic column: OV-1701, 30 m×0.25 mm, 1.8 μm (stationary phase composition: 7% cyanopropyl-7% phenyl-86% dimethylpolysiloxane copolymer)
the carrier gas: helium
the linear velocity: 1.0 mL/min the inlet temperature: 180° C.
the injection volume: 2.0 µL
the split ratio: 25:1
the heating procedure:
the initial temperature is 60° C., holding for 2 min, then increased to 240° C. at a rate of 15° C./min, holding for 5 min
the ion source mode: CI, positive ion
a collision gas: methane
the ion source: 250° C.
the temperature of the quadrupole: 170° C.
the relative voltage: 200 V
the scanning mode: single ion extraction mode (SIM)
SIM ion current: m/z 105.0 or m/z 75.0
the diluent: N-methyl pyrrolidone and
the blank solution: the same as the diluent
Preparation of standard solutions for N-nitrosodimethylamine (NDMA) reference substance: an appropriate amount of N-nitrosodimethylamine (NDMA) reference substance was diluted in the diluent to NDMA concentration of: 0.2, 0.8, 3.2, 6.4, 20 µg/mL, respectively, shaken until completely dissolved before use.

Detection of the Content of N-Nitrosodimethylamine (NDMA) in Crude Valsartan (Material Before Solvent Crystallization of API):

400 mg Valsartan crude (sample 4) was taken and precisely weighed into a 20 mL headspace bottle. After that, 2 mL of the diluent was accurately added, shaken until dissolved and mixed well, as a test solution. The above-mentioned GC-MS method was used to detect the test solution and NDMA standard solutions of different concentrations, and the standard curve method was used to calculate the content of NDMA in sample 4. The content of N-nitrosodimethylamine (NDMA) in Valsartan crude (sample 4) was 27.5 ppm.

EXAMPLE 5

Chromatographic Conditions:
the instrument: Agilent gas chromatography single quadrupole mass spectrometer (Agilent 7697A/5975C/7890A)
the chromatographic column: DB-624, 30 m×0.32 mm, 1.8 µm (stationary phase composition: 6% cyanopropyl-94% dimethylpolysiloxane copolymer)
the carrier gas: helium
the linear velocity: 1.0 mL/min
the inlet temperature: 160° C.
the injection volume: 1.0 µL
the split ratio: 10:1
the heating procedure:
the initial temperature is 60° C., holding for 2 min, then increased to 240° C. at a rate of 15° C./min, holding for 5 min
the ion source mode: EI, positive ion
the ion source: 230° C.
the temperature of the quadrupole: 160° C.
the relative voltage: 210 V
the scanning mode: single ion extraction mode (SIM)
SIM ion current: m/z 74.0
the diluent: DMSO and
the blank solution: the same as the diluent
Preparation of standard solutions for N-nitrosodimethylamine (NDMA) reference substance: an appropriate amount of N-nitrosodimethylamine (NDMA) reference substance was diluted in the diluent to NDMA concentration of: 0.2, 0.8, 3.2, 6.4, 20 µg/mL, respectively, shaken until completely dissolved before use.

Detection of the Content of N-Nitrosodimethylamine (NDMA) in the Crystallization Solvent of Valsartan API, i.e. Ethyl Acetate:

10 mL ethyl acetate (sample 5) was accurately measured in a 20 mL headspace bottle and shaken to mix well, as the test solution. The above-mentioned GC-MS method was used to detect the test solution and NDMA standard solutions of different concentrations, and the standard curve method was used to calculate the content of NDMA in sample 5. N-nitrosodimethylamine (NDMA) was not detected in ethyl acetate (sample 5).

EXAMPLE 6

Chromatographic Conditions:
the instrument: ThermoFischer gas chromatography single quadrupole mass spectrometry (Trace 1300 & ISQLT)
the chromatographic column: DB-225, 30 m×0.25 mm, 1.8 µm (stationary phase composition: 50% cyanopropyl-50% dimethylpolysiloxane copolymer)
the carrier gas: nitrogen
the linear velocity: 1.5 mL/min
the inlet temperature: 170° C.
the injection volume: 2.0 µL
the split ratio: 20:1
the heating procedure:
the initial temperature is 55° C., holding for 6 min, then increased to 250° C. at a rate of 12° C./min, holding for 5 min
the ion source mode: EI, positive ion
the ion source: 230° C.
the temperature of the quadrupole: 150° C.
the relative voltage: 200 V
the scanning mode: single ion extraction mode (SIM)
SIM ion current: m/z 74.0
the diluent: DMSO and
the blank solution: the same as the diluent
Preparation of standard solutions for N-nitrosodimethylamine (NDMA) reference substance: an appropriate amount of N-nitrosodimethylamine (NDMA) reference substance was diluted in the diluent to NDMA concentration of: 0.2, 0.8, 3.2, 6.4, 20 µg/mL, respectively, shaken until completely dissolved before use.

Detection of the Content of N-Nitrosodimethylamine (NDMA) in Losartan Potassium API:

400 mg Losartan potassium API (sample 6) was taken and precisely weighed into a 20 mL headspace bottle. After that, 2 mL of the diluent was accurately added, shaken until dissolved and mixed well, as a test solution. The above-mentioned GC-MS method was used to detect the test solution and NDMA standard solutions of different concentrations, and the standard curve method was used to calculate the content of NDMA in sample 6. N-nitrosodimethylamine (NDMA) was not detected in Losartan potassium API (sample 6).

EXAMPLE 7

Chromatographic Conditions:
the instrument: Agilent gas chromatography single quadrupole mass spectrometer (Agilent 7697A/5975C/7890A)

the chromatographic column: DB-1701, 30 m×0.32 mm, 1.0 μm (14% cyanopropylphenyl-86% dimethylpolysiloxane copolymer)
the carrier gas: helium
the linear velocity: 1.0 mL/min
the inlet temperature: 200° C.
the injection volume: 2.0 μL
the split ratio: 3:1
the heating procedure:
the initial temperature is 45° C., holding for 5 min, then increased to 200° C. at a rate of 10° C./min, holding for 5 min
the ion source mode: EI, positive ion
the ion source: 230° C.
the temperature of the quadrupole: 150° C.
the relative voltage: 200 V
the scanning mode: single ion extraction mode (SIM)
a solvent delay: 13 min
SIM ion current: m/z 74.0
the diluent: DMSO and
the blank solution: the same as the diluent Preparation of standard solutions for N-nitrosodimethylamine (NDMA) reference substance: an appropriate amount of N-nitrosodimethylamine (NDMA) reference substance was diluted in the diluent to NDMA concentration of: 0.2, 0.8, 3.2, 6.4, 20 μg/mL, respectively, shaken until completely dissolved before use.

Detection of the Content of N-Nitrosodimethylamine (NDMA) in Valsartan API:

400 mg Valsartan API (sample 7) was taken and precisely weighed into a 20 mL headspace bottle. After that, 2 mL of the diluent was accurately added, shaken until dissolved and mixed well, as a test solution. The above-mentioned GC-MS method was used to detect the test solution and NDMA standard solutions of different concentrations, and the standard curve method was used to calculate the content of NDMA in sample 7. The content of N-nitrosodimethylamine (NDMA) in Valsartan API (sample 7) was 0.8 ppm.

EXAMPLE 8

Chromatographic Conditions:
the instrument: Agilent gas chromatography single quadrupole mass spectrometer (Agilent 7697A/5975C/7890A)
the chromatographic column: DB-624, 30 m×0.32 mm, 1.8 μm (stationary phase composition: 6% cyanopropyl-94% dimethylpolysiloxane copolymer)
the carrier gas: helium
the linear velocity: 1.8 mL/min
the inlet temperature: 150° C.
the injection volume: 1.0 μL
the split ratio: 3:1
the heating procedure:
the initial temperature is 60° C., holding for 2 min, then increased to 240° C. at a rate of 15° C./min, holding for 5 min
the ion source mode: EI, positive ion
the ion source: 230° C.
the temperature of the quadrupole: 150° C.
the relative voltage: 200 V
the scanning mode: single ion extraction mode (SIM)
SIM ion current: m/z 74.0
the diluent: DMSO:water=1:1 and
the lank solution: the same as the diluent
Preparation of standard solutions for N-nitrosodimethylamine (NDMA) reference substance: an appropriate amount of N-nitrosodimethylamine (NDMA) reference substance was diluted in the diluent to NDMA concentration of: 0.2, 0.8, 3.2, 6.4, 20 μg/mL, respectively, shaken until completely dissolved before use.

Detection of the Content of N-Nitrosodimethylamine (NDMA) in Valsartan Tablets:

4 Valsartan tablets (with specification of 80 mg, sample 8) were precisely weighed in a 20 mL headspace bottle, then dissolved in the diluent, and the tablet was completely disintegrated by vortex oscillation for 30 min, which was kept in the headspace bottle at 90° C. for 30 min, as the test solution. The above-mentioned GC-MS method was used to detect the test solution and NDMA standard solutions of different concentrations, and the standard curve method was used to calculate the content of NDMA in sample 8. N-nitrosodimethylamine (NDMA) was not detected in Valsartan tables (with specification of 80 mg/tablet, sample 8).

EXAMPLE 9

Chromatographic Conditions:
the instrument: Agilent gas chromatography single quadrupole mass spectrometer (Agilent 7697A/5975C/7890A)
the chromatographic column: HP-INNOWax, 60 m×0.32 mm, 1.8 μm (stationary phase: polyethylene glycol, PEG-20M)
the carrier gas: helium
the linear velocity: 1.8 mL/min
the inlet temperature: 160° C.
the injection volume: 1.0 μL
the split ratio: 3:1
the heating procedure:
the initial temperature is 45° C., holding for 5 min, then increased to 240° C. at a rate of 15° C./min, holding for 5 min
the ion source mode: EI, positive ion
the ion source: 230° C.
the temperature of the quadrupole: 150° C.
the relative voltage: 200 V
the scanning mode: single ion extraction mode (SIM)
SIM ion current: m/z 74.0
the diluent: DMF and
the blank solution: the same as the diluent
Preparation of standard solutions for N-nitrosodimethylamine (NDMA) reference substance: an appropriate amount of N-nitrosodimethylamine (NDMA) reference substance was diluted in the diluent to NDMA concentration of: 0.2, 0.8, 3.2, 6.4, 20 μg/mL, respectively, shaken until completely dissolved before use.

Detection of the Content of N-Nitrosodimethylamine (NDMA) in Irbesartan Hydrochlorothiazide Tablets:

4 Irbesartan hydrochlorothiazide tablets (specification: Irbesartan 125 mg, hydrochlorothiazide 12.5 mg, sample 9) were precisely weighed in a 20 mL headspace bottle, then dissolved in the diluent, and the tablet was completely disintegrated by ultrasonic treating for 30 min, which was kept in the headspace bottle at 90° C. for 30 min, as the test solution. The above-mentioned GC-MS method was used to detect the test solution and NDMA standard solutions of different concentrations, and the standard curve method was used to calculate the content of NDMA in sample 9. N-nitrosodimethylamine (NDMA) was not detected in Irbesartan hydrochlorothiazide tablets (specification: Irbesartan 125 mg, hydrochlorothiazide 12.5 mg, sample 9).

EXAMPLE 10

Chromatographic Conditions:
the instrument: Agilent gas chromatography quadrupole-time-of-flight mass spectrometer (GC-QTOF, Agilent 7697A/7200C/7890B)
the chromatographic column: DB-1701, 30 m×0.32 mm, 1.0 μm (14% cyanopropylphenyl-86% dimethylpolysiloxane copolymer)
the carrier gas: helium
the linear velocity: 1.0 mL/min
the inlet temperature: 200° C.
the injection volume: 2.0 μL
the split ratio: 3:1
the heating procedure:
the initial temperature is 45° C., holding for 5 min, then increased to 200° C. at a rate of 10° C./min, holding for 5 min
the ion source mode: EI, positive ion
the ion source: 230° C.
the temperature of the quadrupole: 150° C.
the relative voltage: 200 V
the scanning mode: single ion extraction mode (SIM)
the solvent delay: 13 min
SIM ion current: m/z 74.048
the ion extraction error: 10 ppm
a resolution: 12500
the diluent: DMSO and
the blank solution: the same as the diluent
Preparation of standard solutions for N-nitrosodimethylamine (NDMA) reference substance: an appropriate amount of N-nitrosodimethylamine (NDMA) reference substance was diluted in the diluent to NDMA concentration of: 0.05, 0.10, 0.20, 0.40, 2.0 μg/mL, respectively, shaken until completely dissolved before use.
Detection of the Content of N-Nitrosodimethylamine (NDMA) in Valsartan Tablets:
2 Valsartan tablets (with specification of 160 mg, sample 10) were precisely weighed in a 20 mL headspace bottle, then dissolved in the diluent, and the tablet was completely disintegrated by vortex oscillation for 30 min, which was kept in the headspace bottle at 90° C. for 40 min, as the test solution. The above-mentioned GC-MS method was used to detect the test solution and NDMA standard solutions of different concentrations, and the standard curve method was used to calculate the content of NDMA in sample 10. N-nitrosodimethylamine (NDMA) was 0.03 ppm in Valsartan tables (with specification of 160 mg/tablet, sample 10).

EXAMPLE 11

Chromatographic Conditions:
the instrument: Agilent gas chromatography quadrupole-time-of-flight mass spectrometer (GC-QTOF, Agilent 7697A/7200C/7890B)
the chromatographic column: Thermo Trace TR-Wax MS, 60 m×0.32 mm, 1.0 μm (polyethylene glycol, PEG-20W)
the carrier gas: helium
the linear velocity: 1.0 mL/min
the inlet temperature: 200° C.
the injection volume: 2.0 μL
the split ratio: 3:1
the heating procedure:
the initial temperature is 45° C., holding for 5 min, then increased to 200° C. at a rate of 10° C./min, holding for 5 min
the ion source mode: EI, positive ion
the ion source: 230° C.
the temperature of the quadrupole: 150° C.
the scanning mode: single ion extraction mode (SIM)
the solvent delay: 13 min
SIM ion current: m/z 74.048
the ion extraction error: 10 ppm
the resolution: 13000
the diluent: N-methyl pyrrolidone and
the blank solution: the same as the diluent
Preparation of standard solutions for N-nitrosodimethylamine (NDMA) reference substance: an appropriate amount of N-nitrosodimethylamine (NDMA) reference substance was diluted in the diluent to NDMA concentration of: 0.05, 0.10, 0.20, 0.40, 2.0 μg/mL, respectively, shaken until completely dissolved before use.
Detection of the Content of N-Nitrosodimethylamine (NDMA) in Irbesartan API:
500 mg Irbesartan API (sample 11) was taken and precisely weighed into a 20 mL headspace bottle, then dissolved in the diluent, as a test solution. The above-mentioned GC-MS method was used to detect the test solution and NDMA standard solutions of different concentrations, and the standard curve method was used to calculate the content of NDMA in sample 11. N-nitrosodimethylamine (NDMA) was not detected in Irbesartan API (sample 11).

EXAMPLE 12

Chromatographic Conditions:
the instrument: Agilent gas chromatography quadrupole-time-of-flight mass spectrometer (GC-QTOF, Agilent 7697A/7200C/7890B)
the chromatographic column: TR-MS Wax, 30 m×0.32 mm, 1.0 μm (polyethylene glycol, PEG-20W)
the carrier gas: helium
the linear velocity: 1.0 mL/min
the inlet temperature: 200° C.
the injection volume: 2.0 μL
the split ratio: 3:1
the heating procedure:
the initial temperature is 45° C., holding for 5 min, then increased to 200° C. at a rate of 10° C./min, holding for 5 min
the ion source mode: EI, positive ion
the ion source: 230° C.
the temperature of the quadrupole: 150° C.
the scanning mode: single ion extraction mode (SIM)
the solvent delay: 13 min
SIM ion current: m/z 74.048
the ion extraction error: 10 ppm
the resolution: 13000
the diluent: N-methyl pyrrolidone and
the blank solution: the same as the diluent
Preparation of standard solutions for N-nitrosodimethylamine (NDMA) reference substance: an appropriate amount of N-nitrosodimethylamine (NDMA) reference substance was diluted in the diluent to NDMA concentration of: 0.02, 0.08, 0.30, 0.64, 2.0 μg/mL, respectively, shaken until completely dissolved before use.
Detection of the Content of N-Nitrosodimethylamine (NDMA) in Valsartan Tablets:
2 Valsartan tablets (with specification of 160 mg, sample 12) were precisely weighed in a 20 mL headspace bottle, then dissolved in the diluent, and the tablet was completely disintegrated by vortex oscillation for 30 min, which was kept in the headspace bottle at 90° C. for 40 min, as the test solution. The above-mentioned GC-MS method was used to detect the test solution and NDMA standard solutions of different concentrations, and the standard curve method was used to calculate the content of NDMA. N-nitrosodimethylamine (NDMA) was not detected in Valsartan tables (with specification of 160 mg/tablet, sample 12).

EXAMPLE 13

Chromatographic Conditions:
the instrument: Agilent gas chromatography triple quadrupole mass spectrometer (GC-TQS, Agilent 7600A/7000C/7890B)
the chromatographic column: DB-624, 30 m×0.32 mm, 1.8 μm (stationary phase composition: 6% cyanopropyl-94% dimethylpolysiloxane copolymer)
the carrier gas: helium
the linear velocity: 1.8 mL/min
the inlet temperature: 150° C.
the injection volume: 1.0 μL
the split ratio: 3:1
the heating procedure:
the initial temperature is 60° C., holding for 2 min, then increased to 240° C. at a rate of 15° C./min, holding for 5 min
the ion source mode: EI, positive ion
the collision gas: nitrogen
the detection mode: multi-reaction detection mode (MRM)
the ion source temperature: 230° C.
a dry gas temperature: 550° C.
a dry gas flow rate: 1100 L/h
a cone voltage: 20 V
a cone gas velocity: 50 L/h
a capillary voltage: 2200 V
a collision energy: 6 eV
SIM ion current: m/z 74.0 (parent ion), m/z 42.0 (sub-ion)
The diluent: DMSO and
the blank solution: the same as the diluent
Preparation of standard solutions for N-nitrosodimethylamine (NDMA) reference substance: an appropriate amount of N-nitrosodimethylamine (NDMA) reference substance was diluted in the diluent to NDMA concentration of: 0.05, 0.10, 0.20, 0.40, 2.0 μg/mL, respectively, shaken until completely dissolved before use.

Detection of the Content of N-Nitrosodimethylamine (NDMA) in Losartan Potassium Hydrochlorothiazide Tablets:

3 Losartan potassium hydrochlorothiazide tablets (specification: Irbesartan 50 mg, hydrochlorothiazide 12.5 mg, sample 13) were precisely weighed in a 20 mL headspace bottle, then dissolved in the diluent, and the tablet was completely disintegrated by vortex oscillation for 30 min, which was kept in the headspace bottle at 100° C. for 30 min, as the test solution. The above-mentioned GC-MS method was used to detect the test solution and NDMA standard solutions of different concentrations, and the standard curve method was used to calculate the content of NDMA. N-nitrosodimethylamine (NDMA) was not detected in Losartan potassium hydrochlorothiazide tablets (specification: Irbesartan 50 mg, hydrochlorothiazide 12.5 mg, sample 13).

EXAMPLE 14

Chromatographic Conditions:
the instrument: Agilent gas chromatography triple quadrupole mass spectrometer (GC-TQS, Agilent 7600A/7000C/7890B)
the chromatographic column: DB-1701, 30 m×0.32 mm, 1.0 μm (14% cyanopropylphenyl-86% dimethylpolysiloxane copolymer)
the carrier gas: helium
the linear velocity: 1.0 mL/min
the inlet temperature: 200° C.
the injection volume: 2.0 μL
the split ratio: 3:1
the heating procedure:
the initial temperature is 45° C., holding for 5 min, then increased to 200° C. at a rate of 10° C./min, holding for 5 min
the ion source mode: EI, positive ion
the collision gas: nitrogen
the detection mode: multi-reaction detection mode (MRM)
the ion source temperature: 230° C.
the dry gas temperature: 600° C.
the dry gas flow rate: 1000 L/h
the cone voltage: 22 V
the cone gas velocity: 45 L/h
the capillary voltage: 2500 V
the collision energy: 8 eV
SIM ion current: m/z 74.0 (parent ion), m/z 42.0 (sub-ion)
the diluent: DMSO and
the blank solution: the same as the diluent
Preparation of standard solutions for N-nitrosodimethylamine (NDMA) reference substance: an appropriate amount of N-nitrosodimethylamine (NDMA) reference substance was diluted in the diluent to NDMA concentration of: 0.05, 0.10, 0.20, 0.40, 2.0 μg/mL, respectively, shaken until completely dissolved before use.

Detection of the content of N-nitrosodimethylamine (NDMA) in Irbesartan API: 500 mg Irbesartan API (sample 14) was taken and precisely weighed into a 20 mL headspace bottle. After that, 2 mL of the diluent was accurately added, shaken until dissolved and mixed well, as a test solution. The above-mentioned GC-MS method was used to detect the test solution and NDMA standard solutions of different concentrations, and the standard curve method was used to calculate the content of NDMA. The content of N-nitrosodimethylamine (NDMA) in Irbesartan API (sample 14) was 0.02 ppm.

As can be seen from the above examples, the detection method according to the present application can detect the content of impurity in the sample in ppm level, or even 1% of ppm, showing a low detection limit and high sensitivity, and is especially suitable for the detection of trace NDMA impurity in the sample.

Moreover, it can be seen from the examples that the linear range of the detection method according to the present application is 0.02-2.0 μg/mL. The linear range is wide. It can be seen from FIG. 1 that the detection method according to the present application has good separation effect. In addition, the method according to the present application has good durability.

The above are only preferably examples of the present application and are not used to limit the present application. Any modifications, equivalent replacements, improvements,

The invention claimed is:

1. A method for detecting N-nitrosodimethylamine impurity by gas chromatography-mass spectrometry, wherein the method comprises the following steps:
   (1) dissolving a sample to be detected which is suspected to contain N-nitrosodimethylamine impurity in a diluent to prepare a test solution, wherein the sample to be detected is a sartan active pharmaceutical ingredient (API) intermediate, a solvent used in a synthesis process of a sartan API, a sartan API or a composition containing a sartan API, the solvent is injected directly without diluent; and
   (2) transferring the prepared test solution to an injection vial or headspace bottle, and analyzing the solution in the injection vial or headspace bottle by gas chromatography-mass spectrometry to determine the content of N-nitrosodimethylamine impurity in the sample.

2. The method according to claim 1, wherein step (2) comprises: injecting the test solution into the gas chromatography-mass spectrometry for detection, recording a spectrum of the test solution, and determining the content of N-nitrosodimethylamine in the sample to be detected according to a standard curve of N-nitrosodimethylamine obtained in advance.

3. The method according to claim 1, wherein the sample to be detected is a sartan API intermediate, a solvent used in a synthesis process of a sartan API, a sartan API or a composition containing a sartan API.

4. The method according to claim 1, wherein:
   when the sample to be detected is a sartan API intermediate or sartan API, the sample to be detected is dissolved in a diluent to obtain the test solution;
   when the sample to be detected is a composition containing a sartan API, the composition containing the sartan API is disintegrated with the diluent to obtain the test solution; or
   when the sample to be detected is a solvent used in a synthesis process of a sartan API, the solvent is directly used as the test solution.

5. The method according to claim 1, wherein the method comprises the following steps:
   (1) when the sample to be detected is a sartan API intermediate or sartan API, dissolving the sartan API intermediate or sartan API in a diluent, and preparing the test solution containing 1-5000 mg of the sartan API intermediate or sartan API in 1 mL of the test solution;
   when the sample to be detected is a composition containing a sartan API, disintegrating the composition containing the sartan API in a diluent, and preparing the test solution containing 1-5000 mg of the sartan API in 1 mL of the test solution; or
   when the sample to be detected is a solvent used in a synthesis process of a sartan API, directly using the solvent as the test solution; and
   (2) injecting the test solution into the gas chromatography-mass spectrometry for detection, recording the spectrum of the test solution, and determining the content of N-nitrosodimethylamine in the sample according to a standard curve of N-nitrosodimethylamine obtained in advance.

6. The method according to claim 4, wherein the diluent is selected from the group consisting of water, and a polar organic solvent, or a mixture thereof.

7. The method according to claim 1, wherein the gas chromatography-mass spectrometry is operated under the following conditions:
   a chromatographic column: a gas chromatographic column, wherein the stationary phase is composed of one selected from the group consisting of polysiloxane polymer, cyanopropylphenyl dimethylpolysiloxane copolymer, cyanopropyl dimethylpolysiloxane copolymer, trifluoropropyl dimethylpolysiloxane copolymer, phenyl dimethylpolysiloxane copolymer, dipropylphenyl dimethylpolysiloxane copolymer, diphenyl dimethylpolysiloxane copolymer, and polyethylene glycol or any combination thereof;
   a carrier gas selected from the group consisting of hydrogen, nitrogen and helium;
   a column temperature: 30° C.-350° C.;
   a split ratio: 1:1-500:1;
   an inlet temperature: 100° C.-350° C.;
   an injection mode: a direct injection or headspace injection; and
   a detector: a mass spectrometry detector.

8. The method according to claim 7, wherein the stationary phase of the gas chromatographic column is composed of 14% cyanopropylphenyl-86% dimethylpolysiloxane copolymer, 35% phenyl-65% dimethylpolysiloxane copolymer, 5% phenyl-95% dimethylpolysiloxane copolymer, 6% cyanopropyl-94% dimethylpolysiloxane copolymer, 7% cyanopropyl-7% phenyl-86% dimethylpolysiloxane copolymer, 50% cyanopropyl-50% dimethylpolysiloxane copolymer, 5% cyanopropyl-95% dimethylpolysiloxane copolymer or polyethylene glycol having a molecular weight of 10,000-1,000,000.

9. The method according to claim 7, wherein the mass spectrometry detector is selected from the group consisting of a single quadrupole mass spectrometer, a quadrupole-time-of-flight mass spectrometer and a triple quadrupole mass spectrometer.

10. The method according to claim 3, wherein the sartan API is selected from the group consisting of a compound shown in Formula I:

Formula I wherein $R_1$ represents

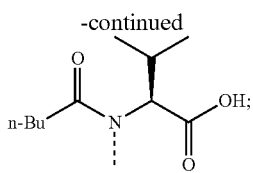

$R_3$ represents H or K.

11. The method according to claim 3, wherein the sartan API is selected from the group consisting of Losartan potassium, Irbesartan and Valsartan.

12. The method according to claim 3, wherein the sartan API intermediate is selected from the group consisting of a compound shown in the Formula II:

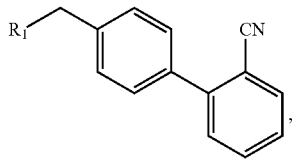

Formula II wherein $R_1$ represents

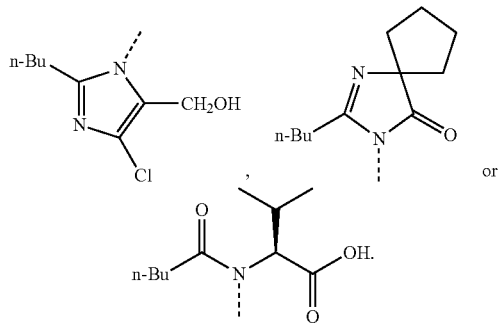

13. The method according to claim 5, wherein when the sample to be detected is the sartan API intermediate or sartan API, the sartan API intermediate or sartan API is dissolved in the diluent, and the test solution containing 1-1000 mg of the sartan API intermediate or sartan API in 1 mL of the test solution is prepared; or when the sample to be detected is the composition containing the sartan API, the composition containing the sartan API is disintegrated in the diluent, and the test solution containing 1-1000 mg of the sartan API in 1 mL of the test solution is prepared.

14. The method according to claim 5, wherein when the sample to be detected is the sartan API intermediate or sartan API, the sartan API intermediate or sartan API is dissolved in the diluent, and the test solution containing 5-200 mg of the sartan API intermediate or sartan API in 1 mL of the test solution is prepared; or when the sample to be detected is the composition containing the sartan API, the composition containing the sartan API is disintegrated in the diluent, and the test solution containing 5-500 mg of the sartan API in 1 mL of the test solution is prepared.

15. The method according to claim 5, wherein when the sample to be detected is the composition containing the sartan API, the composition containing the sartan API is disintegrated in the diluent, and the test solution containing 5-30 mg of the sartan API in 1 mL of the test solution is prepared.

16. The method according to claim 6, wherein the polar organic solvent is one selected from the group consisting of N,N-dimethylformamide, N-methylpyrrolidone, dimethyl sulfoxide, methanol, ethanol, isopropanol, acetone, methyl tert-butyl ether, acetonitrile, ethylene glycol, propanediol, glycerol, formic acid, acetic acid, propionic acid, methanesulfonic acid, triethylamine, dimethylamine, dimethylpropylamine, pyridine, morpholine, piperazine, tetrahydropyrrole, and piperidine or any combination thereof.

17. The method according to claim 7, wherein:
the column temperature is 40° C.-300° C.;
the split ratio is 1:1-100:1;
the inlet temperature is 150° C.-300° C.; or
the injection mode is a headspace injection.

18. The method according to claim 7, wherein:
the column temperature is 45° C.-250° C.;
the split ratio is 1:1-50:1; or
the inlet temperature is 150° C.-200° C.

19. The method according to claim 7, wherein:
the split ratio is 3:1-25:1.

* * * * *